United States Patent [19]

Becker

[11] 4,446,046

[45] May 1, 1984

[54] POLY (ALKENYL) PHOSPHONIC ACID AND METHODS OF USE THEREOF

[75] Inventor: Larry W. Becker, Wilmington, Del.

[73] Assignee: Betz Laboratories, Inc., Trevose, Pa.

[21] Appl. No.: 451,569

[22] Filed: Dec. 20, 1982

Related U.S. Application Data

[62] Division of Ser. No. 274,700, Jun. 17, 1981, abandoned.

[51] Int. Cl.³ .............................................. C02F 5/14
[52] U.S. Cl. ..................................... 252/181; 252/82; 252/87; 252/180; 252/389 A
[58] Field of Search ................... 252/82, 87, 180, 181, 252/389.2

[56] References Cited

U.S. PATENT DOCUMENTS

| | | | |
|---|---|---|---|
| 2,365,466 | 12/1944 | Hamilton | 260/543 |
| 2,382,309 | 8/1945 | Hamilton | 260/551 |
| 2,439,214 | 4/1948 | Lindsey | 260/84 |
| 3,105,819 | 10/1963 | Anderson | 252/49.9 |
| 3,108,535 | 10/1963 | Uhlig | 101/149.2 |
| 3,179,518 | 4/1965 | Uhlig et al. | 96/33 |
| 3,202,534 | 8/1965 | Duch et al. | 117/75 |
| 3,220,832 | 11/1965 | Uhlig | 96/1 |
| 3,276,868 | 10/1966 | Uhlig | 96/1.5 |
| 3,297,663 | 1/1967 | Herbst et al. | 260/80 |
| 3,315,599 | 4/1967 | Lind | 101/149.2 |
| 3,396,020 | 8/1968 | Borchers | 96/33 |
| 3,434,838 | 3/1969 | Munder et al. | 96/75 |
| 3,468,725 | 9/1969 | Uhlig | 148/6.15 |
| 3,510,307 | 5/1970 | Borchers et al. | 96/75 |
| 3,519,607 | 7/1970 | Welch | 260/80 |
| 3,657,092 | 4/1972 | Fischer et al. | 204/181 |
| 3,684,779 | 8/1972 | Rapko | 252/175 |
| 3,837,803 | 9/1974 | Carter et al. | 252/181 |
| 3,992,318 | 11/1976 | Gaupp et al. | 252/389 A |
| 4,170,563 | 10/1979 | Merrill et al. | 252/62.1 L |
| 4,209,398 | 6/1980 | Ii et al. | 252/180 |

FOREIGN PATENT DOCUMENTS

| | | | |
|---|---|---|---|
| 1032537 | 6/1958 | Fed. Rep. of Germany . | |
| 1160733 | 2/1961 | Fed. Rep. of Germany . | |
| 1106963 | 5/1961 | Fed. Rep. of Germany . | |
| 1121632 | 1/1962 | Fed. Rep. of Germany . | |
| 1130177 | 5/1962 | Fed. Rep. of Germany . | |
| 1134093 | 8/1962 | Fed. Rep. of Germany . | |
| 1135176 | 8/1962 | Fed. Rep. of Germany . | |
| 1182926 | 12/1964 | Fed. Rep. of Germany . | |
| 1182927 | 12/1964 | Fed. Rep. of Germany . | |
| 1196467 | 7/1965 | Fed. Rep. of Germany . | |
| 1237899 | 3/1967 | Fed. Rep. of Germany . | |
| 1801411 | 5/1970 | Fed. Rep. of Germany . | |
| 2537160 | 3/1976 | Fed. Rep. of Germany . | |
| 2455624 | 5/1976 | Fed. Rep. of Germany . | |
| 2634784 | 8/1976 | Fed. Rep. of Germany . | |
| 1447953 | 12/1976 | Fed. Rep. of Germany . | |
| 2615489 | 10/1977 | Fed. Rep. of Germany . | |
| 2745982 | 4/1979 | Fed. Rep. of Germany | 252/180 |
| 2015964 | 8/1969 | France . | |
| 43-20999 | 9/1968 | Japan . | |
| 48-08700 | 3/1973 | Japan | 252/180 |
| 48-32383 | 10/1973 | Japan . | |
| 6500493 | 7/1965 | Netherlands . | |
| 6807938 | 6/1969 | South Africa . | |
| 933107 | 8/1963 | United Kingdom . | |
| 10199919 | 2/1966 | United Kingdom . | |
| 1084070 | 9/1967 | United Kingdom . | |
| 1129820 | 10/1968 | United Kingdom . | |
| 1230447 | 5/1971 | United Kingdom . | |
| 1290724 | 9/1972 | United Kingdom . | |
| 176682 | 11/1965 | U.S.S.R. . | |
| 179469 | 2/1966 | U.S.S.R. . | |

OTHER PUBLICATIONS

Kolesnikov, G. S. et al., "Carbon-Chain Polymers and Copolymers, LVII, Copolymerization of α-Phenylvinylphosphonic Acid with Methyl Methacrylate and Methacrylic Acid", Vysokomolekul. Soedin., 7(11), 1913–1915, 1965.

Kolesnikov, G. S. et al., "Carbon-Chain Polymers and Copolymers, LVIII, Copolymerization of α-Phenylvinylphosphonic acid with Acrylic Acid and Acrylonitrile", Vysokomolekul. Soedin. 7(12), 2160–2163 (1965).

Kolesnikov, G. S. et al., "Synthesis of Ion-Exchange Resins by Copolymerization of α-Phenylvinylphosphonic Acid with Methyl Methacrylate and Methacrylic Acid by Suspension Polymerization", Plasticheskie Massy 1966(2), 12–13.

Alovitdinov, A. B., et al. "Polyelectrolytes from Copolymers of α-Phenylvinylphosphinic Acids", Plasticheskie Massy 1966(8), 21–23.

Kolesnikov, G. S. et al., "Synthesis of Homogeneous Ion-Exchange Membranes", Sin. Svoistva Ionoobmen. Mater. 1968, 6–10.

Kolesnikov, G. S. et al., "Properties of Copolymers of α-Phenylvinyl Phosphonic Acid with Methacrylic and Acrylic Acids", Vysokomol. Soedin., Ser. B 1968, 10(3), 176–178.

Laskorin, B. N. et al., "Infrared Spectroscopic Study of Phosphorus-Containing ion Exchangers", Zh. Prikl. Khim. (Leningrad) 1969, 42(3), 522–529.

Alovitdinov, A. B. et al., "Copolymers of α-Phenylvinyl Phosphonic Acid with Vinyl Monomers", Plast. Massy 1969, (6), 13–15.

Levin, Ya. A. et al., "Synthesis and Properties of Poly(-Vinyl Phosphonic Acid)", Sb. Nekot. Probl. Org. Khim., Mater. Nauch. Sess., Inst. Org. Fiz. Khim., Akod. Nauk SSSR, 1972, 106–108.

Marhol, M. et al., "Selective Properties and Analytical use of an Ion-Exchange Resin Based on α-phenylvinylphosphonic Acid", J. Chromatogr. 1974, 102, 89–94.

Levin, Ya. A. et al., "Polyelectrolyte Properties of Poly(Vinyl Phosphonic Acid) and copolymers of Vinylphosphonic acid", Vysokomol. Soedin., Ser. A 1975, 17(4), 766–771.

Imoto et al., "Vinyl Polymerization, 388, Mechanism of Radical Polymerization of Methyl Methacrylate Initiated by the Hydrophilic Macromolecule-Copper (II) Ion-Water System and Derivation of the Rate Equation for Polymerization", Nippon Kagaku Kaishi 1979, (II), 1540–1548.

Reinhardt, R. M. et al., "Ultraviolet Radiation in Treatments for Imparting Functional Properties to Cotton Textiles", Text. Res. J. 1980, 50(3), 139–147.

Primary Examiner—John E. Kittle

*Assistant Examiner*—Robert A. Wax
*Attorney, Agent, or Firm*—Alexander D. Ricci; Bruce E. Peacock

[57] ABSTRACT

A polymer composition having a repeat unit characterized by the formula

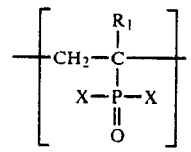

wherein $R_1$=an alkyl group having one to six carbon atoms; X=OH or OM, M=a cation; is disclosed. The composition is effective in inhibiting the precipitation of certain scale forming salts, and also acts to inhibit corrosion in water systems.

9 Claims, No Drawings

POLY (ALKENYL) PHOSPHONIC ACID AND METHODS OF USE THEREOF

This is a division of application Ser. No. 274,700 filed on June 17, 1981, now abandoned.

FIELD OF THE INVENTION

The present invention pertains to a composition and method of utilization of same to inhibit corrosion and control the formation and deposition of scale imparting compounds in water systems such as cooling, boiler and gas scrubbing systems.

BACKGROUND OF THE INVENTION

The problems of corrosion and scale formation and attendant effects have troubled water systems for years. For instance, scale tends to accumulate on internal walls of various water systems, such as boiler and cooling systems, and thereby materially lessens the operational efficiency of the system.

Deposits in lines, heat exchange equipment, etc., may originate from several causes. For example, precipitation of calcium carbonate, calcium sulfate and calcium phosphate in the water system leads to an agglomeration of these scale imparting compounds along or around the metal surfaces which contact the flowing water circulating through the system. In this manner, heat transfer functions of the particular system are severely impeded.

Corrosion, on the other hand, is a degradative electrochemical reaction of a metal with its environment. Simply stated, it is the reversion of refined metals to their natural state. For example, iron ore is iron oxide. Iron oxide is refined into steel. When the steel corrodes, it forms iron oxide which, if unattended, may result in failure or destruction of the metal, causing the particular water system to be shut down until the necessary repairs can be made.

Typically, in cooling water systems, the fomation of calcium sulfate, calcium phosphate and calcium carbonate, among others, has proven deleterious to the overall efficacy of the cooling water system. Recently, due to the popularity of cooling treatments using high levels of orthophosphate to promote passivation of the metal surfaces in contact with the system water, it has become critically important to control calcium phosphate crystallization so that relatively high levels of orthophosphate may be maintained in the system to achieve the desired passivation without resulting in fouling or impeded heat transfer functions which would normally be caused by calcium phosphate crystallization.

Although steam generating systems are somewhat different from cooling water systems, they share a common problem in regard to deposit formation.

As detailed in the Betz Handbook of Industrial Water Conditioning, 8th Edition, 1960, Betz Laboratories, Inc., Trevose, PA Pages 85-96, the formation of scale and sludge deposits on boiler heating surfaces is a serious problem encountered in steam generation. Although current industrial steam producing systems make use of sophisticated external treatments of the boiler feedwater, e.g., coagulation, filtration, softening of water prior to its feed into the boiler system, these operations are only moderately effective. In all cases, external treatment does not in itself provide adequate treatment since muds, sludge, silts and hardness-imparting ions escape the treatment, and eventually are introduced into the stream generating system.

In addition to the problems caused by mud, sludge or silts, the industry has also had to contend with boiler scale. Although external treatment is utilized specifically in an attempt to remove calcium and magnesium from the feedwater, scale formation due to residual hardness, i.e., calcium and magnesium salts, is always experienced. Accordingly, internal treatment, i.e., treatment of the water fed to the system, is necessary to prevent, reduce and/or retard formation of the scale imparting compounds and their deposition. The carbonates of magnesium and calcium are not the only problem compounds as regards scale, but also waters having high contents of phosphate, sulfate and silicate ions either occurring naturally or added for other purposes cause problems since calcium and magnesium, and any iron or copper present, react with each and deposit as boiler scale. As is obvious, the deposition of scale on the structural parts of a steam generating system causes poorer circulation and lower heat transfer capacity, resulting accordingly, in an overall loss in efficiency.

Detailed Description of the Invention

In accordance with the invention, it has been surprisingly discovered that a homopolymer, having a repeat unit represented by the following structural formula

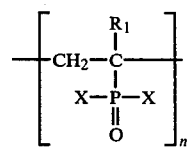

wherein $R_1$ = lower alkyl of from 1 to about 6 carbon atoms, and wherein X=OH, or OM where M is a cation; is effective in controlling the formation of mineral deposits and inhibiting corrosion in various water systems. At present, the polymer preferred for use is poly(isopropenylphosphonic acid) i.e., $R_1=CH_3$.

For instance, the above polymers have proven effective as corrosion inhibition agents in simulated cooling water and boiler water systems. Also, the polymers have proven efficacious in their ability to inhibit the formation of $CaSO_4$, $CaCO_3$, and $Ca_3(PO_4)_2$.

The monomer, to be used in the polymerization process, may be prepared by a reaction mechanism involving the nucleophilic addition of $PCl_3$ to the carbonyl group of a compound corresponding to the desired alpha-beta ethylenically unsaturated phosphonic acid monomers. For instance, the reaction may proceed in accordance with the following equations:

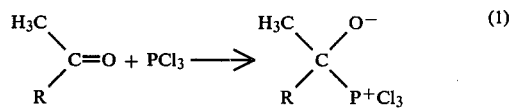

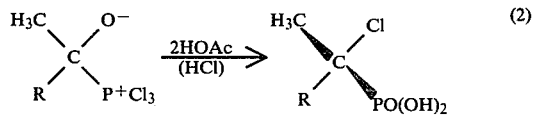

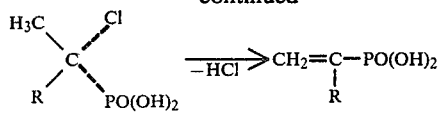

R is an alkyl group of from about 1 to 6 carbon atoms. In this manner, the desired monomer may be produced in a most cost effective manner due to the relativity low economic cost of the precursor ketone compounds, such as acetone.

It is also possible to produce the desired monomer via dehydration, by heating the corresponding alpha-hydroxyl alkyl phosphonic acid at a temperature of about 125°–250° C., as is detailed in U.S. Pat. No. 2,365,466.

After the desired monomer is isolated, radical chain addition polymerization may proceed in bulk, suspension, solution, emulsion, or thermal polymerization form. For instance, in suspension polymerization, the reaction may be initiated by benzoyl peroxide, with the monomer suspended in ethyl acetate or like solution. On the other hand, an aqueous solution polymerization reaction may be initiated via a conventional persulfate initiator. The fact that polymers were formed was substantiated by $^{31}$PMR spectroscopy where broad absorptions between about −20 and −40 ppm are known to indicate significant polymer function.

The polymers should be added to the aqueous system, for which corrosion inhibiting, and/or deposit control activity is desired, in an amount effective for the purpose. This amount will vary depending upon the particular system for which treatment is desired and will be influenced by factors such as, the area subject to corrosion, pH, temperature, water quantity and the respective concentrations in the water of the potential scale and deposit forming species. For the most part, the polymers will be effective when used at levels of about 0.1–500 parts per million parts of water, and preferably from about 1.0 to 100 parts per million of water contained in the aqueous system to be treated. The polymers may be added directly into the desired water system in a fixed quantity and in the state of an aqueous solution, continuously or intermittently.

The polymers of the present invention are not limited to use in any specific category of water system. For instance, in addition to boiler and cooling water systems, the polymers may also be effectively utilized in scrubber systems and the like wherein corrosion and/or the formation and deposition of scale forming salts is a problem. Other possible environments in which the inventive polymers may be used include heat distribution type sea water desalting apparatus and dust collection systems in iron and steel manufacturing industries.

The poly(alkenyl)phosphonic acid polymers of the present invention can also be used with other components in order to enhance the corrosion inhibition and scale controlling properties thereof. For instance the polymers may be used in combination with one or more kinds of compounds selected from the group consisting of inorganic phosphoric acids, phosphonic acid salts, organic phosphoric acid esters, and polyvalent metal salts.

Examples of such inorganic phosphoric acids include condensed phosphoric acids and water soluble salts thereof. The phosphoric acids include an orthophosphoric acid, a primary phosphoric acid and a secondary phosphoric acid. Inorganic condensed phosphoric acids include polyphosphoric acids such as pyrophosphoric acid, tripolyphosphoric acid and the like, metaphosphoric acids such as trimetaphosphoric acid, and tetrametaphosphoric acid.

As to the other phosphonic acid derivatives which are to be added in addition to the poly(alkenyl)phosphonic acid polymers of the present invention, there may be mentioned aminopolyphosphonic acids such as aminotrimethylene phosphoric acid, ethylene diaminetetramethylene phosphonic acid and the like, methylene diphosphonic acid, hydroxyethylene diphosphonic acid, 2-phosphonobutane 1,2,4, tricarboxylic acid etc.

Exemplary organic phosphoric acid esters which may be combined with the polymers of the present invention include phosphoric acid esters of alkyl alcohols such as methyl phosphoric acid ester, ethyl phosphoric acid ester, etc., phosphoric acid esters of methyl cellosolve and ethyl cellosolve, and phosphoric acid esters of polyoxyalkylated polyhydroxy compounds obtained by adding ethylene oxide to polyhydroxy compounds such as glycerol, mannitol, sorbitol, etc. Other suitable organic phosphoric esters are the phosphoric acid esters of amino alcohols such as mono, di, and tri-ethanol amines.

Inorganic phosphoric acid, phosphonic acid, and organic phosphoric acid esters may be salts, preferably salts of alkali metal, ammonia, amine and so forth.

Exemplary polyvalent metal salts which may be combined with the polymers of formula (I) above include those capable of dissociating polyvalent metal cations in water such as $Zn^{++}$, $Ni^{++}$, etc., which include zinc chloride, zinc sulfate, nickel sulfate, nickel chloride and so forth.

When the polymer (I) is added to the aqueous system in combination with an additional component selected from the group consisting of inorganic phosphoric acids, phosphonic acids, organic phosphoric acids esters, their water-soluble salts (all being referred to hereinafter as phosphoric compounds), and polyvalent metal salts, a fixed quantity of said polymer (I) may be added separately and in the state of aqueous solution into the system. The poly(alkenyl)phosphonic acid polymers (I) may be added either continuously or intermittently. Alternatively, the polymer (I) may be blended with the above noted phosphoric compounds or polyvalent metal salts and then added in the state of aqueous solution into the water system either continuously or intermittently. The phosphoric compounds or polyvalent metal salts are utilized in the usual manner for corrosion and scale preventing purposes. For instance, the phosphoric compounds or polyvalent metal salts may be added to a water system continuously or intermittently to maintain their necessary concentrations.

Generally, the phosphoric compounds should be present in the aqueous system in an amount of about 1–100 ppm (as $PO_4$) or the polyvalent metal salts should be present in an amount of about 1 to 50 ppm (as metal cation).

As is conventional in the art, the phosphoric compounds or polyvalent metal salts may be added, as pretreatment dosages, to the water system in an amount of about 20 to about 500 ppm, and thereafter a small quantity of chemicals may be added, as maintenance dosages.

The polymers (I) may be used in combination with conventional corrosion inhibitors for iron, steel, copper, copper alloys or other metals, conventional scale and contamination inhibitors, metal ion sequestering agents, and other conventional water treating agents. Exemplary corrosion inhibitors comprise chromates, bichromates, tungstate, molybdates, nitrites, borates, silicates, oxycarboxylic acids, amino acids, catechols, aliphatic amino surface active agents, benzotriazole, and mercaptobenzothiazole. Other scale and contamination inhibitors include lignin derivatives, tannic acids, starch, polyacrylic soda, polyacrylic amide, etc. Metal ion sequestering agents include polyamines, such as ethylene diamine, diethylene triamine and the like and polyamino carboxylic acids, such as nitrilo triacetic acid, ethylene diamine tetraacetic acid, and diethylene triamine pentaacetic acid.

EXAMPLES

The invention will now be further described with reference to a number of specific examples which are to be regarded solely as illustrative, and not as restricting the scope of the invention.

EXAMPLE 1

Preparation of Isopropenyl Phosphonic Acid

To a 3 l. 3 neck flask equipped with a magnetic stirrer, thermometer, and pressure compensated addition funnel, was added 300 g (5.2 mole) of acetone. Phosphorus trichloride (730 g; 5.3 mole) was added rapidly through the addition funnel. The addition was only slightly exothermic. The mixture was stirred for 4½ hours. Acetic acid (1500 ml) was then added and a reflux condenser was added to the flask. The mixture became cloudy and refluxed as a copius quantity of hydrogen chloride was evolved. After the refluxing had subsided, hydrogen chloride gas was bubbled through the solution for ½ hour. The reaction mixture was then allowed to stir at room temperature overnight. The flask was equipped for distillation and volatiles were removed at atmospheric pressure until a head temperature of 118° C. was reached. A water aspirator was attached and the distillation continued until the pot temperature reached 175° C. The remainder of the volatiles were removed at ≃1 mm and a pot temperature of 180°–190° C. The product was a viscous golden-yellow liquid and weighed 571 g (91%). After the mixture was cooled, sufficient water was added to give a 50% aqueous solution. The $^{13}$CMR spectrum of aqueous product showed three doublets at $\delta = 140.4$, 132.7 ppm (J=172.1 Hz); 129.9 ppm (J=9.8 Hz); 19.4, 18.9 ppm (J=13.4 Hz). The $^{31}$PMR spectrum showed a single peak at $\delta = -19.0$ ppm. There was a trace of an inorganic phosphorus impurity.

EXAMPLE 2

Non-Aqueous Polymerization of Isopropenylphosphonic Acid

Anhydrous isopropenylphosphonic acid (100 g, 0.8 mole) was slurried with 250 g of ethyl acetate under nitrogen in a 3-neck flask equipped for mechanical stirring and reflux. Benzoyl peroxide (4 g) was added and the slurry was heated to reflux. Additional increments of benzoyl peroxide were added over a 6–7 hour time period until a total of 12 g had been added. During this period, the liquid monomer was converted to a gum which accumulated around the sides of the reaction flask. After cooling, the ethyl acetate was decanted and the remaining residue was triturated with acetone to give, after drying, 70.1 g of off-white polymer. The $^{31}$PMR showed an intense absorption at $\delta = -26.7$ ppm and a lesser intense multiplet at $\delta = -30$ to $-34$ ppm.

EXAMPLE 3

Aqueous Polymerization of Isopropenylphosphonic Acid

Isopropenylphosphonic acid (45 g, 54%, 0.2 mole) was treated with sodium hydroxide (7 g, 0.175 mole) and heated to reflux under nitrogen. Ammonium persulfate (3 g) was added. The solution was refluxed for one hour and an additional 3 g of initiator was added. After three hours of additional reflux, a $^{31}$PMR of the product showed numerous polymer peaks from $\delta = -32$ to $-24$ ppm. A trace of monomer can be observed at $\delta = -15.8$ ppm.

EXAMPLE 4

Preparation of α-n-hexylvinylphosphonic Acid

Phosphorus trichloride (274.6 g; 2 mole) and 2-octanone (256 g; 2.0 mole) were mixed and allowed to stir at room temperature as described in Example 1. Acetic acid (500 ml) was added, followed by HCl saturation. The mixture was allowed to stand overnight. Removal of the volatiles gave 328 g (85%) of a thick oil as a residue. The $^{31}$PMR spectrum showed a peak at $\delta = -19.0$ ppm consistent with structure.

EXAMPLE 5

Aqueous Polymerization of α-n-hexylvinylphosphonic Acid

Sodium hydroxide (8 g; 0.2 mole) was dissolved in 100 ml water. To this solution was added 38.4 g (0.2 mole) of α-n-hexylvinylphosphonic acid. A white precipitate formed which was completely soluble at reflux. The solution was degassed and 5 g of sodium persulfate was added. After two hours of reflux an additional 5 g was added. Within the next hour, a very viscous foaming solution was formed. Reflux was continued for an additional four hours. A $^{31}$PMR showed polymer absorption at $\delta = -28$ to $-30$ ppm and $-25$ ppm. A slight amount of monomer and some inorganic phosphorus contaminants were also present.

EXAMPLE 6

In order to assess the performance of the polymers of the present invention, in their ability to control deposits in boiling water applications, they were tested in experimental boiler systems having electrical heat sources. In these experimental boiler systems, circulation of water is permitted via natural convection. Two probes are installed in the described path and are positioned so that one probe sits above the other. The probes permit measurement of deposition, if any, at two locations in the depth through which the water circulates.

The tests conducted using these experimental boilers were operated under the conditions specified in Tables VI and VIa below. After test completion, the probes were removed and chemical analyses were employed to determine total deposit quantities. The deposits were dissolved in hydrochloric acid and hydrofluoric acid and the solutions were analyzed for calcium, magnesium, phosphate and silica, since the test program was designed to evaluate this type of deposit. Deposit weights were calculated from the solution and the results are reported in Tables VI and VIa hereinbelow.

TABLE VI

Low Pressure Boiler Evaluation of
Poly(isopropenylphosphonic acid)

| Treatment Type | Boiler Concentration ppm | Average Deposit* (g/ft²) |
| --- | --- | --- |
| Versa TL-3 | 5 | 2.2 |
| Versa TL-3 | 10 | 1.2 |
| PIPPA | 10 | 1.9 |
| PIPPA | 20 | 1.4 |

Versa TL-3 = sulfonated styrene maleic anhydride copolymer sold by National Starch Co., molecular weight 3000

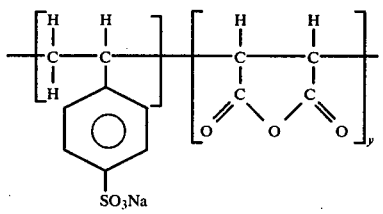

x:y = 3:1
PIPPA = poly(isopropenylphosphonic acid)
* = average between lower and higher probe
Test Conditions:
Pressure: 300 psig
Heat Flux: 185,000 BTU/ft²/hr.
Residual Phosphate: 20 ppm
Feedwater Hardness: 15 ppm as CaCO₃ (10 Ca/5 Mg)
Cycles: 15
Steam Rate: 8 lbs/hr.

TABLE VIa

High Pressure Boiler Evaluation of
Poly(isopropenylphosphonic acid)

| Treatment Type | Boiler Concentration ppm | Average Deposit* (g/ft²) |
| --- | --- | --- |
| Control | — | 4.5 |
| Control | — | 5.6 |
| PIPPA | 10 | 0.7 |
| PIPPA | 20 | 0.5 |
| PIPPA | 40 | 0.6 |
| Tamol 850 | 20 | 2.2 |
| Tamol 850 | 20 | 1.1 |
| Daxad 30S | 20 | 0.5 |

Tamol 850 = an aqueous acrylic emulsion sold by Rohm & Haas
Daxad 30S = sodium salt of carboxylated polyelectrolyte sold by W. R. Grace
PIPPA = poly(isopropenylphosphonic acid)
* = average between lower and higher probe
Test Conditions:
Pressure: 1450 psig
Feedwater Iron Concentration: 3.2 Fe
Residual Phosphate: 20 ppm
Steam Rate: 16 lbs/hr.
Heat Flux: 300,000 BTU/ft²/hr.

In order to evaluate the efficacy of isopropenylphosphonic acid as a corrosion inhibitor in cooling water systems, this polymer was tested utilizing a procedure commonly referred to as the "Spinner Test".

EXAMPLE 7

The tests were each conducted with two non-pretreated low carbon steel and two pretreated LCS coupons which were immersed and rotated in aerated synthetic cooling water for a 3 or 4 day period. The water was adjusted to the desired pH and readjusted after one day if necessary; no further adjustments were made. Water temperature was 120° F. Rotational speed was maintained to give a water velocity of 1.3 feet per second past the coupons. The total volume of water was 17 liters. Cooling water was manufactured to give the following conditions:

|  | SCW₆ (pH = 6) | SCW₇ (pH = 7) | SCW₈ (pH = 8) |
| --- | --- | --- | --- |
| ppm Ca as CaCO₃ | 170 | 170 | 170 |
| ppm Mg as CaCO₃ | 110 | 110 | 110 |
| ppm SiO₂ | 0 | 15 | 15 |
| ppm Na₂CO₃ | 0 | 0 | 100 |

Corrosion rate measurement was determined by weight loss measurement. Prior to immersion, coupons were scrubbed with a mixture of trisodium phosphate-pumice, rinsed with water, rinsed with isopropyl alcohol and then air dried. Weight measurement to the nearest milligram was made. At the end of one day, a weighed coupon was removed and cleaned. Cleaning consisted of immersion into a 50% solution of HCl for approximately 20 seconds, rinsing with tap water, scrubbing with a mixture of trisodium-pumice until clean, then rinsing with tap water and isopropyl alcohol. When dry, a second weight measurement to the nearest milligram was made. At the termination of the tests, the remaining coupon was removed, cleaned and weighed.

Corrosion rates were computed by differential weight loss according to the following equation:

$$\text{Corrosion Rate} = \frac{N\text{th Day Weight Loss} - 1\text{st Day Weight Loss}}{N - 1}$$

where $N = 3$ or 4.

The cooling water was prepared by first preparing the following stock solutions:

Solution A-212.4 g CaCl₂.2H₂O/l
Solution B-229.9 g MgSO₄.7H₂O/l
Solution C-25.2 g NaSiO₃.9H₂O/l
Solution D-85 g Na₂CO₃/l
Treatment Solutions-1.7% solution (1.7 g/100 ml)

Then, these solutions were combined using the following order of addition:

1. To 17 l of de-ionized water add, with stirring, (a) 20 ml of Solution A, and (b) 20 ml of Solution B.
2. Adjust pH to 6.
3. With stirring add treatment.
4. For SCW₇ and 20 ml of Solution C and, adjust pH to 7.0.
5. For SCW₈ add 20 ml of Solution D and adjust to pH 8.0.

The results of these tests are reported hereinbelow in Table VII in terms of mils per year (mpy) and ppm (actives) of the polymer treatment in each bath.

TABLE VII

Cooling Water Corrosion Study

| Inhibitor | Active ppm | Water | Corrosion LCS | Corrosion PTLCS |
| --- | --- | --- | --- | --- |
| PIPPA | 10 | SCW₆ | 99.5 | 57 |
| PIPPA | 100 | SCW₆ | 14.5 | 7.5 |
| PIPPA | 10 | SCW₇ | 67.0 | 30.0 |
| PIPPA | 100 | SCW₇ | 14.0 | 8.0 |
| PIPPA | 10 | SCW₈ | 30.0 | 24.0 |
| PIPPA | 100 | SCW₈ | 11.0 | 1.5 |

PIPPA = Poly(isopropenylphosphonic acid)
LCS = Low carbon steel
PTLCS = pretreated low carbon steel

EXAMPLE 8

One method of evaluating deposit control activity of a material consists of measuring its ability to prevent bulk phase precipitation of a salt at conditions for which the salt would normally precipitate. It is additionally important to recognize that the material being evaluated is tested at "substoichiometric" concentrations. That is, typical molar ratios of precipitating cation to the material being evaluated are on the order of 20:1 and much greater. Consequently, stoichiometric sequestration is not the route through which bulk phase precipitation is prevented. This well known phenomenon is also called "threshold" treatment and is widely practiced in water treatment technology for the prevention of scale (salt) deposits from forming on various surfaces. In the results that follow calcium phosphate, calcium carbonate, and calcium sulfate salts commonly found in industrial water systems under various conditions have been selected as precipitants. The polymers of the present invention has been evaluated for their aility to prevent precipitation (i.e., inhibit crystallization) of these salts. The results are expressed as "percent inhibition", positive values indicate that the stated percentage of precipitate was prevented from being formed. Except as where noted to the contrary, the following conditions, solutions, and testing procedure were utilized to perform the calcium carbonate, calcium phosphate and calcium sulfate inhibition tests, the results of which are reported herein in Tables VIII and IX.

| CALCIUM PHOSPHATE INHIBITION PROCEDURE | |
|---|---|
| Conditions | Solutions |
| T = 70° C. | 36.76 $CaCl_2.2H_2O$/liter $DIH_2O$ |
| pH 8.5 | 0.4482 g $Na_2HPO_4$/liter $DIH_2O$ |
| 17 hour equilibration | |
| $Ca^{+2}$ = 250 ppm as $CaCO_3$ | |
| $PO_4^{-3}$ = 6 ppm | |

Procedure
1. To about 1800 ml $DIH_2O$ in a 2 liter volumetric flask, add 20 ml of $CaCl_2.2H_2O$ solution followed by 2 drops of conc. HCl.
2. Add 40 ml of $Na_2HPO_4$ solution.
3. Bring volume to 2 liters with DI water.
4. Place 100 ml aliquots of solution in 4 oz glass bottles.
5. Add treatment.
6. Adjust pH as desired.
7. Place in 70° C. water bath and equilibrate for 17 hours.
8. Remove samples and filter while hot through 0.2μ filters.
9. Cool to room temperature and take Absorbance measurements using Leitz photometer (640 nm).
   Preparation for Leitz
   a. 5 mls filtrate
   b. 10 mls Molybdate Reagent
   c. 1 dipper Stannous Reagent
   d. Swirl 1 minute, pour into Leitz cuvette; wait 1 minute before reading.
10. Using current calibration curve (Absorbance vs ppm $PO_4^{-3}$) find ppm $PO_4^{-3}$ of each sample.
    Calculation:
    % Inhibition =

$$\frac{\text{ppm } PO_4^{-3} \text{ (treated)} - \text{ppm } PO_4^{-3} \text{ (control)}}{\text{ppm } PO_4^{-3} \text{ (stock)} - \text{ppm } PO_4^{-3} \text{ (control)}} \times 100$$

| CALCIUM SULFATE INHIBITION PROCEDURE | |
|---|---|
| Conditions | Chemicals |
| pH = 7.0 | 1 × $10^{-1}$ M $CaCl_2.2H_2O$ |
| T = 50° C. | 1 × $10^{-1}$ M $Na_2SO_4$ |
| 24 hour equilibration | |
| $Ca^{+2}$ = 2000 ppm | |
| $SO_4^{-2}$ = 4800 ppm | |

Procedure
1. Add 50 ml of $10^{-1}$ M $CaCl_2.2H_2O$ pre-adjusted to pH 7.0

-continued

| CALCIUM SULFATE INHIBITION PROCEDURE |
|---|
| to a 4 oz. bottle. |

2. Add treatment.
3. Add 50 ml of $10^{-1}$ M $Na_2SO_4$ preadjusted to 7.0.
4. Heat samples for 24 hours in a 50° C. water bath.
5. Cool for 30 minutes, at least.
6. Filter 5 ml through 0.45μ filters.
7. Add NaOH to pH 12.0 and dilute to 50 ml with DI $H_2O$.
8. Add $Ca^{+2}$ indicator (1 level).
9. Titrate to purple-violet endpoint with EDTA.
   Calculation:
   % Inhibition =

$$\frac{\text{mls titrant (treated)} - \text{mls titrant (control)}}{\text{mls titrant }(Ca^{+2}\text{ stock}) - \text{mls titrant (control)}} \times 100$$

| CALCIUM CARBONATE INHIBITION | |
|---|---|
| Conditions | Solutions |
| pH = 9.0, 8.5 | 3.25 g $CaCl_2.2H_2O$/liter DI $H_2O$ |
| T = 70° C. | 2.48 g $Na_2CO_3$/liter DI $H_2O$ |
| 5 hour equilibrium | |
| 442 ppm $Ca^{+2}$ | |
| 702 ppm $CO_3^{-2}$ | |

Procedure
1. Add 50 ml $CaCl_2.2H_2O$ pre-adjusted to pH 9.0.
2. Add 40 ml of $Na_2HPO_4$ solution.
3. Add 50 ml $Na_2CO_3$ pre-adjusted to pH 9.0.
4. Heat 5 hours at 70° C. water bath. Remove and cool to room temperature.
5. Filter 5 mls through 0.2μ filters.
6. Adjust samples to pH <1.0 with conc. HCl (1 g Conc. HCl).
7. Allow to stand at least 15 minutes.
8. Dilute to 50 mls with DI $H_2O$.
9. Bring pH to 12.0 with NaOH.
10. Add $Ca^{+2}$ indicator (1 level).
11. Titrate with EDTA to purple-violet endpoint.
    Calculation:
    % Inhibition =

$$\frac{\text{ml EDTA titrated (treated)} - \text{ml EDTA titrated (control)}}{\text{ml EDTA titrated }(Ca^{+2}\text{ stock}) - \text{ml EDTA titrated (control)}} \times 100$$

TABLE VIII

| | % Inhibition | | |
|---|---|---|---|
| $CaCO_3$ Inhibition | 1 ppm | 3 ppm | 5 ppm |
| PIPPA | 8.9 | 32.3 | 38.3 |
| DQ 2000 | 69 | 71 | 75.4 |
| DQ 2010 | 61 | 67 | 64.1 |
| $CaSO_4$ Inhibition | 1 | 3 | 5 |
| PIPPA | 37.3 | 54 | 99 |
| DQ 2000 | 93.7 | 99.4 | 98.6 |
| DQ 2010 | 31.3 | 30.9 | 31.0 |
| $Ca_3(PO_4)_2$ Inhibition | 10 | 25 | 50 |
| PIPPA | 41.0 | 41.0 | 43.1 |
| DQ 2000 | 23.5 | 26.1 | 38.2 |

TABLE VIII-continued

| | | | |
|---|---|---|---|
| DQ 2010 | 9.0 | 9.0 | 11.3 |

PIPPA = Poly(isopropenylphosphonic acid)
DQ 2010 = 60% active acid solution, M.W. = 206

$$O=P(OH)-C(OH)(CH_3)-P(OH)=O \quad \text{Monsanto}$$

DQ 2000 = 50% active solution,

N(CH_2-P(OH)_2=O)_3  Monsanto

TABLE IX

| | % Inhibition | | |
|---|---|---|---|
| CaCO$_3$ Inhibition | 1 ppm | 3 ppm | 5 ppm |
| Poly-α-n-hexylvinyl phosphonic acid | 1.9 | 5.9 | 31.5 |
| DQ 2000 | 52.2 | 59.1 | 70.4 |
| DQ 2010 | 58.6 | 68.5 | 59.6 |
| AA/HPA | 11.8 | 44.3 | 45.3 |
| Ca$_3$(PO$_4$)$_2$ Inhibition* | 5 ppm | 10 ppm | 20 ppm |
| Poly-α-n-hexylvinyl phosphonic acid | 13.6 | 15.4 | 71.5 |
| DQ 2000 | 14.3 | 16.1 | 19.5 |
| DQ 2010 | 9.0 | 22.7 | 7.4 |
| AA/HPA | 55.8 | 80.2 | 84.6 |
| CaSO$_4$ Inhibition | ½ ppm | 1 ppm | 3 ppm |
| Poly-α-n-hexylvinyl phosphonic acid | 6.4 | 19.3 | 85.3 |
| DQ 2000 | 3.9 | 95.3 | 97.9 |
| DQ 2010 | 4.4 | 6.0 | 27.4 |

\* = pH = 7.5
AA/HPA = acrylic acid/2-hydroxypropyl acrylate, MW 6,000 molar ratio AA:HPA - 3:1
DQ 2000 and DQ 2010 = same as in Table VIII.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

I Claim:

1. Method of inhibiting corrosion of and deposit formation along metallic parts in contact with a boiler water system comprising adding to said system an effective amount of a water soluble polymer (I) having a repeat unit represented by the formula

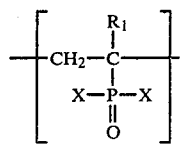

wherein R$_1$ is a lower alkyl group of one to about six carbon atoms, and wherein X=OH or OM, where M is a cation.

2. Method as defined in claim 1 wherein said polymer (I) is added to said aqueous medium in an amount of about 0.1–500 parts polymer I per one million parts of said aqueous medium.

3. Method as defined in claim 1 further comprising adding to said system, an effective amount for the purpose, of a compound (II) selected from the group consisting of inorganic phosphoric acids and water soluble salts thereof, phosphonic acids and water soluble thereof, organic phosphoric acid esters and water soluble salts thereof, and polyvalent metal salts capable of being dissociated to polyvalent metal ions in water.

4. Method as defined in claim 3 wherein said inorganic phosphoric acid (II) is a member selected from the group consisting of orthophosphoric acid, primary phosphoric acid, secondary phosphoric acid, pyrophosphoric acid, tripolyphosphoric acid, trimetaphosphoric acid, tetrametaphosphoric acid and water soluble salts thereof.

5. Method as defined in claim 3 wherein said phosphonic acid (II) is a member selected from the group consisting of ethylene diamine tetramethylene phosphonic acid, methylene diphosphonic acid, hydroxyethylidene diphosphonic acid and 2-phosphono-butane 1,2,4-tricarboxylic acid.

6. Method as defined in claim 3 wherein said polyvalent metal salt is a member selected from the group consisting of zinc chloride, nickel chloride, zinc sulfate and nickel sulfate.

7. Method as defined in claim 3 wherein said compound (II) is added to said system in an amount of 20 to about 500 parts per million parts of said system.

8. Method as defined in claim 1 wherein R$_1$=CH$_3$.

9. Method as defined in claim 1 wherein R$_1$=C$_6$H$_{13}$.

* * * * *